United States Patent [19]

McNulty

[11] Patent Number: 4,857,202

[45] Date of Patent: Aug. 15, 1989

[54] SODIUM-SELECTIVE CATION EXCHANGE RESINS FOR AMMONIA-CYCLE CONDENSATE POLISHING

[75] Inventor: James T. McNulty, Perkasie, Pa.

[73] Assignee: Rohm and Haas Company, Philadelphia, Pa.

[21] Appl. No.: 34,524

[22] Filed: Apr. 3, 1987

Related U.S. Application Data

[63] Continuation of Ser. No. 735,410, May 17, 1985, abandoned.

[51] Int. Cl.⁴ .................................................. C02F 1/42
[52] U.S. Cl. ...................................... 210/662; 210/681
[58] Field of Search .................................. 210/681, 662

[56] References Cited

U.S. PATENT DOCUMENTS

| | | | |
|---|---|---|---|
| 4,349,442 | 9/1982 | Barraque et al. | 210/681 |
| 4,547,291 | 10/1985 | Kunin et al. | 210/681 |
| 4,548,717 | 10/1985 | Kunin et al. | 210/681 |
| 4,568,466 | 2/1986 | Salem et al. | 210/681 |

Primary Examiner—Ivars Cintins
Attorney, Agent, or Firm—John E. Taylor, III

[57] ABSTRACT

Ion exchange resin beds used for ammonia-cycle condensate polishing show enhanced selectivity for sodium ions over ammonium ions when conventional, monosulfonated cation exchange resin is replaced with polysulfonated cation exchange resin. This enhanced selectivity results in a lower concentration of sodium ion leakage and longer bed life to critical leakage, compared with conventional, monosulfonated resins.

10 Claims, No Drawings

SODIUM-SELECTIVE CATION EXCHANGE RESINS FOR AMMONIA-CYCLE CONDENSATE POLISHING

This is a continuation of application Ser. No. 735,410, filed May 17, 1985, now abandoned.

This invention relates to ion exchange treatment of steam generator condensate. More particularly, it relates to a process for condensate polishing using polysulfonated, strong-acid, cation exchange resins operated in an ammonia cycle.

BACKGROUND OF THE INVENTION

Condensate polishing is a specialized application for ion exchange resins, in which these resins are used to treat the water from which steam is generated to drive steam turbines. Commonly, the generating system is a closed cycle, in which the steam is condensed, polished by passing it through the ion exchange bed, and vaporized again to operate the turbine. Purity requirements for such waters are stringent, and levels above a few parts per billion (ppb=$1\times10^{-9}$ g/g) sodium ion, for example, are considered unacceptable. The condensate polishing bed of ion exchange resins is intended to maintain the undesirable impurities below levels such as these, especially in the event of a leak in the condenser cooling system, which might permit raw cooling water to enter the closed, high-purity, steam-generating system. Such leaks will challenge the system with ionic impurities at levels typically on the order of a few hundred ppb. In addition, the cation exchange resin of the condensate polisher must control the level of sodium introduced during regeneration of the ion exchange resins. During the separation that precedes regeneration of mixed-bed condensate polishers, a small amount of the cation exchange resin is unavoidably entrained with the anion exchange resin, and is exhausted with sodium during the anion exchange regeneration with sodium hydroxide. Some of this sodium will leak into the condensate, and must also be controlled to the requisite level.

The resin for these stringent requirements for water purity is to protect the system, especially the turbine, from corrosion. For this reason, also, ammonia is added to the steam generator feed water, to adjust the system to a slightly alkaline pH. The levels of ammonia used are quite low, typically from a few hundred to a few thousand ppb ammonium ion. The cation exchange resin in the ion exchange resin bed is thus presented with a difficult task: it must allow the few thousand ppb ammonia to remain in the condensate, but must remove any excess metal ions down to the required purity level.

Cation exchange resins which heretofore have typically been used in this application operate initially in the "hydrogen cycle". That is, upon regeneration, the cation exchange resin is in the hydrogen ion form, and upon exposure to ammonium ions in the condensate water, it will exchange the hydrogen ions for the ammonium ions, lowering the concentration of ammonium ions and lowering the pH of the condensate water. As ammonia continues to be added to the condensate, all of the hydrogen-form cation exchange resin will be converted to the ammonium form, and the ammonium ion begins to break through the bed at approximately the input concentration, signaling the beginning of the "ammonia cycle" operation.

Sodium ions are present in the condensate system; most often these are introduced during regeneration of the resin bed, when a small amount of the cation exchange resin is carried into the anion exchange resin regeneration vessel and exposed to the sodium hydroxide regenerant. Additional sodium may be present from water leaks or other sources. The cation exchange resins which have been used in the past for condensate polishing leak relatively little sodium during the hydrogen cycle, and little difficulty is met keeping the sodium concentration below the required limit. At the establishment of the ammonia cycle, however, the concentration of sodium ions in the condensate, i.e., the sodium leakage, is no longer controlled by the sodium-hydrogen equilibrium, which strongly favors adsorption of sodium. The controlling equilibrium becomes the sodium-ammonium equilibrium, which favors adsorption of ammonium ions about equally with sodium ions. The sodium ion leakage will continue to be low in absolute terms, but it will sharply increase over the leakage observed during the hydrogen cycle, and this increase is often enough to exceed the sodium ion leakage specification for the condensate system.

THE INVENTION

I have discovered that a certain class of cation exchange resins possesses a more favorable sodium-ammonium selectivity than the previously used cation exchange resins, and I have further discovered a particular process by which condensate polishing resin beds may be operated, which takes advantage of this more favorable selectivity during the ammonia cycle to produce polished condensate of superior quality, in that it contains exceptionally low levels of sodium ions compared to those previously achievable.

Polysulfonated aromatic cation exchange resins show an unexpected affinity for sodium ions in preference to ammonium ions at the concentration levels encountered in condensate polishing. The selectivity coefficient $K_{NH430}{}^{Na+}$ for such resins is typically about 2.8, compared to the $K_{NH4+}{}^{Na+}$ of typically 1.0 or less for conventional cation exchange resins used for condensate polishing applications.

The resins operable in the present invention are those prepared by polysulfonation from crosslinked aromatic copolymers, including both gel and macroporous copolymers. The preferred copolymers are macroporous, styrenic copolymers.

As used herein, macroporous copolymers include macroreticular copolymers prepared by suspension polymerization in the presence of a phase-extending agent, as described in U.S. Pat. Nos. 4,256,840 and 4,224,415, and copolymers into which large pores have been introduced by other means, as for example the technique described in U.S. Pat. No. 3,122,514. The resins prepared from macroporous copolymers are called macroporous resins.

Polysulfonation, as used herein, refers to a sulfonation process that is sufficiently vigorous to introduce an average of more than one sulfonate group per aromatic nucleus. Such vigorous sulfonation is accompanied by the formation of a significant number of sulfone crosslinks, in which sulfonate groups bridge between two aromatic nuclei to form —$SO_2$— crosslinks. Thus, while polysulfonation may produce a resin with strong-acid ion exchange capacity greater than that of a fully monosulfonated resin, that is not necessarily so.

As the polysulfonation produces both sulfonate and sulfone groups, analytical identification of the polysulfonated resin is best done by conventional microanalytical procedures for elemental sulfur content. A polysulfonated resin, as used herein, is one in which the microanalytical value for sulfur introduced into the resin molecular structure by the sulfonation process is at least 1.04 times, preferably at least 1.07 times, and more preferably at least 1.16 times the value for the sulfur so introduced by conventional, sulfuric acid sulfonation of the same copolymer. In general, conventional, sulfuric acid sulfonation of lightly crosslinked copolymers will introduce approximately the same amount of sulfur as would theoretically be expected for complete monosulfonation of the copolymer. In highly crosslinked copolymers, however, sulfonation tends to occur predominantly at or near the surface of the copolymer particle, and to a lesser extent at increasing distances from the surface. Polysulfonation exhibits a similar phenomenon; a highly crosslinked, polysulfonated copolymer may contain less sulfur than theoretically expected for monosulfonation, yet the accessible aromatic nuclei will be polysulfonated.

The process of the present invention comprises passing steam condensate containing ammonium ions and sodium ions through a bed of polysulfonated, aromatic cation exchange resin, preferably until the ammonia cycle has been established, and thereafter preferentially exchanging sodium ions from the solution for ammonium ions fixed at the exchange sites on the resin, until the sodium ions on the resin approach equilibrium with the sodium ions in the solution. Approach to resin equilibrium with sodium ions, as used herein, is indicated by a rise in sodium leakage through the resin bed, or an increase in the rate at which the sodium leakage rises, over the relatively low leakage or slow increase in leakage at the start of the ammonia cycle. In practical terms exchange continues until the rising sodium leakage, caused by the approach to sodium-resin equilibrium, reaches a preselected value higher than the initial sodium leakage at the start of the ammonia cycle. This value of sodium leakage is usually chosen to be equal to the maximum permissible sodium level for the system.

The actual operating conditions may be varied to vary the useful life of the resin in the ammonia cycle, that is, the operating time between the start of the ammonia cycle and the saturation with sodium ions. Among the conditions affecting the useful life of the resin in the ammonia cycle are the volume of resin in the bed, the flow of condensate, the concentration of sodium ions entering the bed, and the concentration of ammonium ions in the condensate; the relationship of these parameters is described below.

The following example is intended to illustrate the invention, and not to limit it except as it is limited in the claims. All percentages are by weight unless otherwise indicated, and all reagents used are of good commercial quality.

EXAMPLE 1

This example illustrates the process of the present invention and compares the results of this process with results of the prior-art process using conventional, monosulfonated ion exchange resin.

Conditions for the example were selected to simulate typical ammonia-cycle condensate polishing conditions. Available cation exchange sites on the resin were loaded 99% with ammonium ions and 1% with sodium ions, simulating the condition of a resin which has freshly begun the ammonia cycle. The concentration of ammonium ion was 1882 ppb, calculated as $CaCO_3$ producing a simulated condensate having a pH of 9.6. This level closely approximates the 2000 ppb ammonium ion, calculated as $CaCO_3$, typically found in ammonia-cycle condensate. The level of sodium ion leakage from the sodium-form resin was measured in the liquid phase using a specific-ion electrode.

These values may be used to determine the selectivity coefficient $K_{NH_4^+}^{Na^+}$ which defines the following equilibrium:

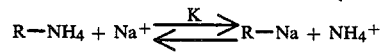

The selectivity coefficient may be calculated from the following equation:

$$K_{NH_4^+}^{Na^+} = \frac{(R-Na)(NH_4^+)}{(R-NH_4)(Na^+)}$$

The R refers to the sulfonated styrene-DVB copolymer which serves as the substrate for the fixed ionic charge.

As the selectivity coefficient is often highly dependent on R—Na and on $NH_4^+$, it is necessary to closely approximate actual end-use conditions in order to make useful predictions for high-purity water applications such as condensate polishing. In the present example, both a conventional, monosulfonated cation exchange resin (Amberlite ® 200 ion exchange resin, available from Rohm and Haas Company, Philadelphia, PA 19105) and a polysulfonated styrenic cation exchange resin of the present invention were tested according to the following procedure.

A 90-ml sample of each resin, in the hydrogen form, was converted to the ammonium form using 0.2% ammonium hydroxide. To each 90-ml sample was added 1 ml of the same resin in the sodium form, and each sample was mixed thoroughly. Into 1-in. ID, glass columns were measured 9 ml of each resin in the hydrogen form, and the mixed samples of each resin in the ammonium/sodium form; each mixed resin sample was allowed to rest on top of the corresponding hydrogen form resin without mixing. The contents of each column were rinsed with high-purity (17.2 megohm) water at 200 ml/min until a constant electrical resistance for the effluent was obtained. Water containing the amounts of ammonium hydroxide indicated in Table 1 was passed through each column at 200 ml/min, to simulate the ammonia cycle, until a constant level of sodium ion leakage was observed, at which time the final resistance of the effluent water and the pH of the feed water was measured and recorded.

Table 1 shows the amount of ammonia and sodium ion leakage, calculated for the ionized materials as calcium carbonate, for sodium as the sodium ion, and for ammonia as total $NH_3$, at the beginning and end of the ammonia cycle. The table also shows the concentration of resin in the sodium form, and the value of $K_{NH_4^+}^{Na^+}$ as described above, at the beginning and end of the ammonia cycle.

TABLE 1

| Resin | % Resin In Na+ Form | ppb NH4+ as CaCO3 | ppb Na+ as Na+ | ppb Na+ as CaCO3 | K $\frac{Na^+}{NH_4^+}$ |
|---|---|---|---|---|---|
| Prior-Art Resin | 1.0 | 1235 | 1.5 | 3.27 | 3.81* |
|  |  | 2005 | 8.0 | 17.44 | 1.16 |
|  |  | 1882 | 6.3 | 13.7 | 1.39 |
| After 55 hrs. | 0.91 | 1882 | 6.3 | 13.7 | 1.26 |
| Resin of Present Invention | 1.0 | 1882 | 3.0 | 6.5 | 2.92 |
| After 70 hrs. | 0.95 | 1882 | 3.0 | 6.5 | 2.77 |

*Not yet at equilibrium.

The results shown in Table 1 demonstrate that a consistent and significant reduction in sodium leakage into the polished condensate is achieved by the process of the present invention.

I claim:

1. A process for selectively removing sodium cations from a solution containing sodium and ammonium cations which comprises contacting the solution with a polysulfonated aromatic cation exchange resin.

2. The process of claim 1 wherein the resin is in the form of a bed.

3. The process of claim 2 wherein the solution is contacted with the resin under ammonia cycle conditions.

4. The process of claim 3 wherein the solution is contacted with the resin until sodium leakage through the resin bed reaches a preselected value higher than the leakage at the start of the ammonia cycle conditions.

5. The process of claim 3 wherein the microanalytical value for sulfur introduced into the resin by the sulfonation process is at least 1.04 times the value for the sulfur so introduced by conventional, sulfuric acid sulfonation of the copolymer from which the resin was made.

6. The process of claim 5 wherein the value for sulfur is at least 1.07 times the value for the sulfur introduced by the conventional sulfonation.

7. The process of claim 5 wherein the value for sulfur is at least 1.16 times the value for the sulfur introduced by the conventional sulfonation.

8. The process of claim 3 wherein the solution is steam generator condensate.

9. The process of claim 3 wherein the aromatic resin is a styrenic resin.

10. The process of claim 3 wherein the resin is a macroreticular resin.

* * * * *

UNITED STATES PATENT AND TRADEMARK OFFICE
CERTIFICATE OF CORRECTION

PATENT NO. : 4,857,202
DATED : August 15, 1989
INVENTOR(S) : James T. McNulty

It is certified that error appears in the above-identified patent and that said Letters Patent is hereby corrected as shown below:

Column 2, line 41 reads $K_{NH430}^{Na+}$ should read -- $K_{NH_4}^{Na^+}+$ --.

Column 2, line 42 reads $K_{NH4+}^{Na+}$ should read -- $K_{NH_4}^{Na^+}+$ --.

Column 4, line 14 reads $K_{NH4+}^{Na+}$ should read -- $K_{NH_4}^{Na^+}+$ --.

Column 4, line 25 reads $K_{NH4+}^{Na+}$ should read -- $K_{NH_4}^{Na^+}+$ --.

Column 4, line 67 $K_{NH4+}Na+$ should read -- $K_{NH_4}^{Na^+}+$ --.

Signed and Sealed this

Twenty-fourth Day of July, 1990

*Attest:*

HARRY F. MANBECK, JR.

*Attesting Officer*  *Commissioner of Patents and Trademarks*